(12) United States Patent
Yang et al.

(10) Patent No.: US 11,945,105 B2
(45) Date of Patent: Apr. 2, 2024

(54) TOOTHED SAFE BRAKING APPARATUS FOR ROBOTIC JOINT, ROBOTIC JOINT, AND ROBOT

(71) Applicant: RETHINK ROBOTICS GMBH, Bochum (DE)

(72) Inventors: Yong Yang, Beijing (CN); Sheng Zhang, Hebei (CN); Chao Jiang, Beijing (CN)

(73) Assignee: Rethink Robotics GmbH, Bochum (DE)

( * ) Notice: Subject to any disclaimer, the term of this patent is extended or adjusted under 35 U.S.C. 154(b) by 107 days.

(21) Appl. No.: 17/765,143

(22) PCT Filed: Sep. 30, 2019

(86) PCT No.: PCT/CN2019/109592
§ 371 (c)(1),
(2) Date: Mar. 30, 2022

(87) PCT Pub. No.: WO2021/062698
PCT Pub. Date: Apr. 8, 2021

(65) Prior Publication Data
US 2022/0379497 A1    Dec. 1, 2022

(51) Int. Cl.
*B25J 19/00*   (2006.01)
*B25J 17/02*   (2006.01)
(Continued)

(52) U.S. Cl.
CPC ........... *B25J 19/0004* (2013.01); *B25J 17/02* (2013.01); *F16D 63/006* (2013.01); *F16D 65/16* (2013.01); *F16D 2121/20* (2013.01)

(58) Field of Classification Search
CPC .. B25J 19/0004; F16D 2121/20; F16D 63/006
See application file for complete search history.

(56) References Cited

U.S. PATENT DOCUMENTS 2,903,099 A    9/1959   Nelson
5,133,201 A *  7/1992   LaMott ................. B60R 25/09
                                                              70/226
(Continued)

FOREIGN PATENT DOCUMENTS

CN    105008753 A    10/2015
CN    108515536 A    9/2018
(Continued)

OTHER PUBLICATIONS

Extended European Search Report for European Application No. 19947650.8, dated Sep. 20, 2022.
(Continued)

*Primary Examiner* — Jake Cook
(74) *Attorney, Agent, or Firm* — Morgan, Lewis & Bockius LLP

(57) ABSTRACT

A toothed safe braking apparatus for use in robotic joint, comprising an electromagnetic telescoping apparatus (6) and a friction engagement component (10). The friction engagement component (10) is mounted on a shaft (C) of the robotic joint and comprises a brake lock ring gear (1) provided with a first center fitting hole (12), the brake lock ring gear (1) being provided with teeth (11) arranged on the outer circumferential surface thereof, a pretension ring (2) provided with a second center fitting hole (13), and a brake hub (4) provided with a first end surface (14), a second end surface (15), and an outer circumferential surface (16). On a locked position, a working bit (17) of the electromagnetic telescoping apparatus (6) can be engaged with the teeth (11) on the brake lock ring gear (1) of the friction engagement component (10); and, on an unlocked position, the working bit (17) of the electromagnetic telescoping apparatus (6) can be disengaged from the teeth (11) on the brake lock ring gear (1) of the friction engagement component (10). The brake lock ring gear (1) and the pretension ring (2) are arranged in
(Continued)

parallel via the first fitting hole (12) and the second fitting hole (13) to be friction engaged on the outer circumferential surface (16) of the brake hub (4).

20 Claims, 5 Drawing Sheets

(51) Int. Cl.
    *F16D 63/00*     (2006.01)
    *F16D 65/16*     (2006.01)
    *F16D 121/20*     (2012.01)

(56) References Cited

U.S. PATENT DOCUMENTS

| | | | |
|---|---|---|---|
| 6,250,433 B1 * | 6/2001 | Sealine | B60T 1/005 |
| | | | 188/69 |
| 2005/0139436 A1 * | 6/2005 | Baumann | F16D 55/14 |
| | | | 188/162 |
| 2015/0345571 A1 | 12/2015 | Yi et al. | |
| 2018/0200896 A1 * | 7/2018 | Boyland | H02K 7/102 |
| 2019/0301548 A1 * | 10/2019 | Shao | H02K 7/1021 |
| 2020/0324406 A1 | 10/2020 | Ayuzawa | |

FOREIGN PATENT DOCUMENTS

| | | |
|---|---|---|
| CN | 109366522 A | 2/2019 |
| CN | 208681643 U | 4/2019 |
| EP | 3 348 362 A1 | 7/2018 |
| JP | 2011058578 A | 3/2011 |
| JP | 5257263 B2 | 8/2013 |
| WO | 2018/043486 A1 | 8/2017 |

OTHER PUBLICATIONS

Translation of International Search Report for corresponding International Patent Application No. PCT/CN2019/109592 dated Jun. 23, 2020, 2 pages.

Japanese Office Action for Japanese Patent Application No. 2022-544869, dated May 19, 2023, 8 pages.

* cited by examiner

B-B

B-B

TOOTHED SAFE BRAKING APPARATUS FOR ROBOTIC JOINT, ROBOTIC JOINT, AND ROBOT

This application is the U.S. national stage application of International (PCT) Patent Application Serial No. PCT/CN2019/109592, filed Sep. 30, 2019, the entire disclosure of which is hereby incorporated by reference.

TECHNICAL FIELD

The present invention relates to a toothed safe braking apparatus for use in a robotic joint, a robotic joint and a robot having the toothed safe braking apparatus for use in a robotic joint.

BACKGROUND

At present, various robots are widely used in modern industrial production for picking, delivering, and processing workpieces or cooperating with operators to complete assigned tasks. In many cases, for example, encountering an intruder entering the work area during operation, quickly transferring parts to a desired location for emergency stop, etc., emergency or rapid braking of a robot is required. A robotic joint safety brake is a core functional component to ensure the safe operation of the robot. There are two types of widely used robotic safety brakes: electromagnetic disc brakes and bolt-type brakes. The main problem of the electromagnetic disc brakes is large volume and weight, and serious heating during operation. The main problem of the bolt-type brakes is that the rotating mechanism is not allowed to slip, and it is easy to damage the gear transmission mechanism of the joint.

There is an urgent need for a robotic joint safety brake that can solve the above-mentioned problems.

SUMMARY

The present invention aims to provide a toothed safe braking apparatus for use in a robotic joint, and a robot having the toothed safe braking apparatus for use in a robotic joint. The toothed safe braking apparatus for use in a robotic joint is small in size, light in weight, low in heat generation, and reliable in operation, and can protect a shaft transmission mechanism. Because the robot includes the toothed safe braking apparatus for use in a robotic joint, the robot can make an emergency stop or brake to ensure safety.

In order to achieve the objective above, according to an aspect of the present invention, the present invention provides a toothed safe braking apparatus for use in a robotic joint. The robotic joint includes a main support, and the robotic joint includes a shaft. The toothed safe braking apparatus for use in a robotic joint further includes:
- an electromagnetic telescoping apparatus, mounted on the main support, and provided with a working bit capable of moving between a locked position and an unlocked position along the direction of an axis of the shaft of the robotic joint; and
- a friction engagement component, mounted to the shaft of the robotic joint, the friction engagement component including:
- a disc-shaped brake lock ring gear, provided with teeth arranged on the outer circumferential surface thereof and a first center fitting hole;
- a disc-shaped pretension ring, provided with a second center fitting hole; and
- a disc-shaped brake hub, provided with a first end surface, a second end surface, and an outer circumferential surface;
- wherein the brake lock ring gear and the pretension ring are arranged in parallel via the first center fitting hole and the second center fitting hole to be friction engaged on the outer circumferential surface of the brake hub; and
- wherein on the locked position, the working bit of the electromagnetic telescoping apparatus can be engaged with the teeth on the brake lock ring gear of the friction engagement component, and on the unlocked position, the working bit of the electromagnetic telescoping apparatus can be disengaged from the teeth on the brake lock ring gear of the friction engagement component. By means of the friction engagement component of the present invention, the braking apparatus can be small in size, light in weight, low in heat generation, and reliable in operation, and can protect a shaft transmission mechanism.

Furthermore, the outer circumferential surface of the brake hub has a first conical surface inclined upward from the first end surface and a second conical surface inclined upward from the second end surface. Shape fitting and friction engagement with the first center fitting hole of the brake lock ring gear and the second center fitting hole of the pretension ring are achieved through the first conical surface and the second conical surface of the brake hub.

Furthermore, the first conical surface and the second conical surface on the outer circumferential surface of the brake hub are mirror images of each other with respect to a vertical section of the brake hub. Symmetrical distribution of pretension force can be achieved through the mirror image arrangement of the first conical surface and the second conical surface on the outer circumferential surface of the brake hub.

Furthermore, the first center fitting hole of the brake lock ring gear is configured as a conical hole, so as to fit with the first conical surface on the outer circumferential surface of the brake hub. Shape fitting and friction engagement with the first conical surface of the brake hub is achieved by configuring the first center fitting hole of the brake lock ring gear as the conical hole.

Furthermore, the second center fitting hole of the pretension ring is configured as a conical hole, so as to fit with the second conical surface on the outer circumferential surface of the brake hub. Shape fitting and friction engagement with the second conical surface of the brake hub is achieved by configuring the second center fitting hole of the pretension ring as the conical hole.

Furthermore, the brake lock ring gear and the pretension ring are arranged in parallel via a lock screw to be friction engaged on the outer circumferential surface of the brake hub, and a gap exists between the brake lock ring gear and the pretension ring. By providing the gap between the brake lock ring gear and the pretension ring, a pretension force can be exerted on the outer circumferential surface of a plug brake hub through the brake lock ring gear and a plug pretension ring, respectively.

Furthermore, the gap between the brake lock ring gear and the pretension ring can be adjusted via the lock screw. Because the gap between the brake lock ring gear and the pretension ring can be adjusted via the lock screw, the pretension force can be adjusted.

Furthermore, the brake lock ring gear, the pretension ring, and the brake hub are made of the same material. Making the brake lock ring gear, the pretension ring, and the brake hub are out of the same material can be save manufacturing cost.

Furthermore, the brake lock ring gear, the pretension ring, and the brake hub are made of different materials. Making the brake lock ring gear, the pretension ring, and the brake hub are out of different material can increase elasticity of the brake lock ring gear and the pretension ring, and can also increase the wear resistance of the brake hub.

Furthermore, the first conical surface and the second conical surface of the outer circumferential surface of the brake hub are coated with a ceramic material. By coating the first conical surface and the second conical surface of the outer circumferential surface of the brake hub with the ceramic material, the wear resistance of the brake hub can be increased.

According to another aspect of the present invention, the present invention aims to provide a robot having a toothed safe braking apparatus for use in robotic joint according to novel features of the present invention. By means of the robot including the friction engagement component of the present invention, the braking apparatus can be small in size, light in weight, low in heat generation, and reliable in operation, and can protect a shaft transmission mechanism.

BRIEF DESCRIPTION OF THE DRAWINGS

The following accompanying drawings are only intended to illustrate and explain the present invention schematically, but do not limit the scope of the present invention.

LIST OF REFERENCE NUMERALS

Figure 1:
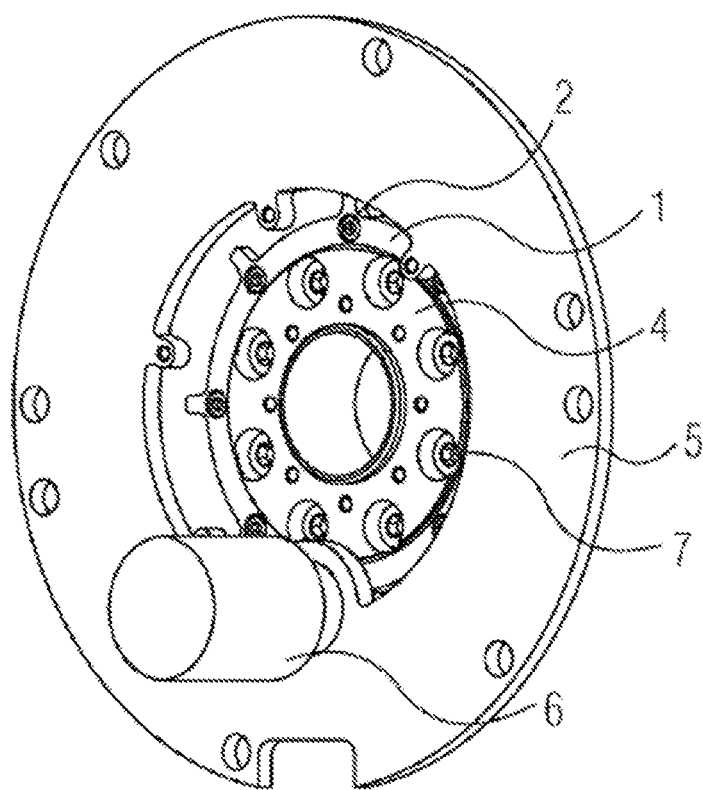
FIG. 1 is a perspective view of a toothed safe braking apparatus for use in a robotic joint according to the present invention, in which a main support of the robot is also shown.

1. Brake lock ring gear
2. Pretension ring
3. Lock screw
4. Brake hub
5. Main support
6. Electromagnetic telescoping apparatus
7. Shaft connection bolt
8. First conical surface
9. Second conical surface
10. Friction engagement component
11. Tooth
12. First center fitting hole
13. Second center fitting hole
14. First end surface
15. Second end surface
16. Outer circumferential surface
17. Working bit
C. Shaft

DETAILED DESCRIPTION

To make the technical features, objectives and effects of the present invention be understood more clearly, the specific embodiments of the present invention are now described with reference to the accompanying drawings.

The composition and working examples of a toothed safe braking apparatus for use in a robotic joint according to the present invention and a robot including the toothed safe braking apparatus for use in a robotic joint will be described in further detail below.

FIG. 1 is a perspective view of a toothed safe braking apparatus for use in a robotic joint according to the present invention, showing a main support 5 of the robotic joint, but not showing a shaft C of the robotic joint.

Figure 2:
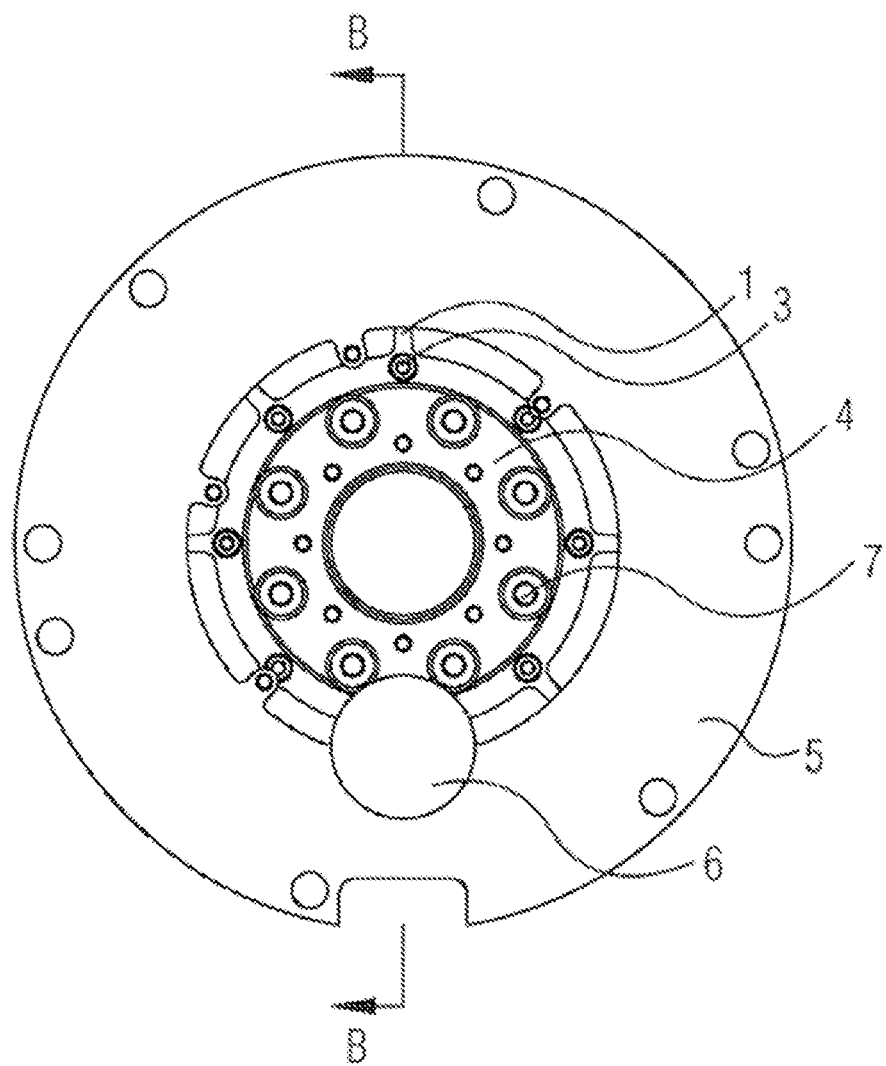
FIG. 2 is a perspective view of a toothed safe braking apparatus for use in a robotic joint according to the present invention, viewing along the direction of an axis of a shaft of the robotic joint, showing a main support of a robot.
Figure 3:
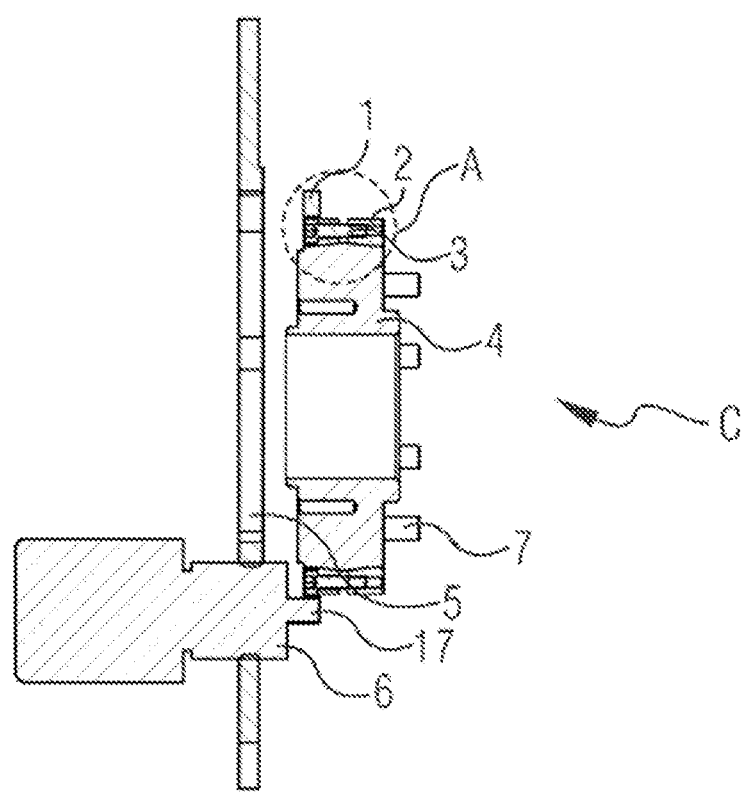
FIG. 3 is a cross-sectional view of a toothed safe braking apparatus for use in a robotic joint according to the present invention, taken at B-B of FIG. 3, showing a main support of a robot and that an electromagnetic telescoping apparatus is located at a locked position.

FIG. 2 and FIG. 3 are respectively a side view and a cross-sectional view of a toothed safe braking apparatus for use in a robotic joint according to the present invention, showing a main support 5 of a robot.

As shown in FIG. 2 and FIG. 3, the toothed safe braking apparatus for use in a robotic joint of the present invention that is used in cooperation with a shaft C of the robotic joint includes a friction engagement component 10 and an electromagnetic telescoping apparatus 6.

The friction engagement component 10 includes a brake lock ring gear 1, a pretension ring 2, and a brake hub 4. The brake lock ring gear 1 is disc-shaped, and the brake lock ring gear 1 is provided with teeth 11 arranged on the outer circumferential surface thereof and a first center fitting hole 12. The pretension ring 2 is disc-shaped, and the pretension ring 2 is provided with a second center fitting hole 13. The brake hub 4 is also disc-shaped, and the brake hub 4 is provided with a first end surface 14, a second end surface 15, and an outer circumferential surface 16. The brake hub 4 and then the friction engagement component 10 are fixed to an end surface (not shown) of the shaft C of the robotic joint via a shaft connection bolt 7. The brake lock ring gear 1 and the pretension ring 2 are arranged in parallel via the first center fitting hole 12 and the second center fitting hole 13 to be friction engaged on the outer circumferential surface 16 of the brake hub 4.

Figure 4:
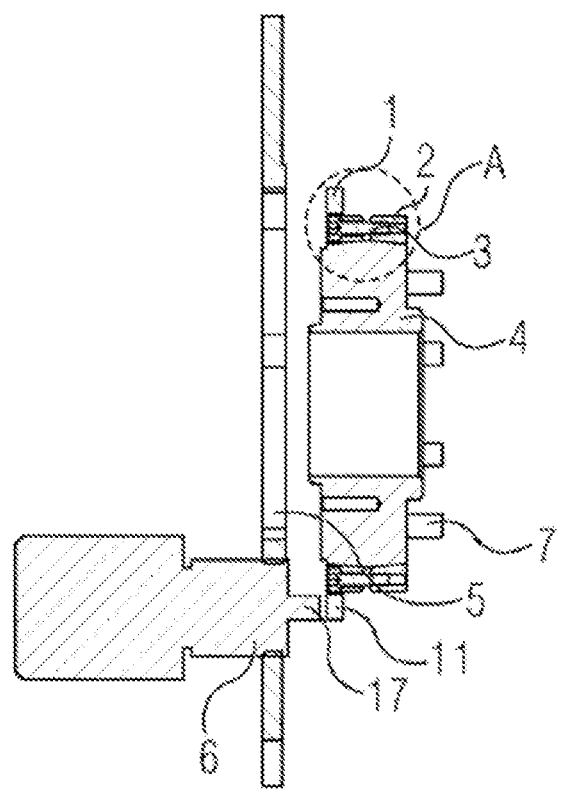
FIG. 4 is a cross-sectional view of a toothed safe braking apparatus for use in a robotic joint according to the present invention, taken at B-B of FIG. 3, showing that an electromagnetic telescoping apparatus is located at an unlocked position.

The electromagnetic telescoping apparatus 6 is mounted on a main support 5 attached to a housing (not shown) of a robot, for example, through threaded connection, and is provided with a working bit 17 capable of moving along the direction of an axis (not shown) of the shaft C of the robotic joint between a locked position and an unlocked position. On the locked position shown in FIG. 3, the working bit 17 of the electromagnetic telescoping apparatus 6 can be engaged with the teeth 11 on the brake lock ring gear 1 of the friction engagement component 10 so as to stop the rotation of the shaft C. On the unlocked position shown in FIG. 4, the working bit 17 of the electromagnetic telescoping apparatus 6 can be disengaged from the teeth 11 on the brake lock ring gear 1 of the friction engagement component 10 so as to allow the shaft C to rotate.

Figure 5:
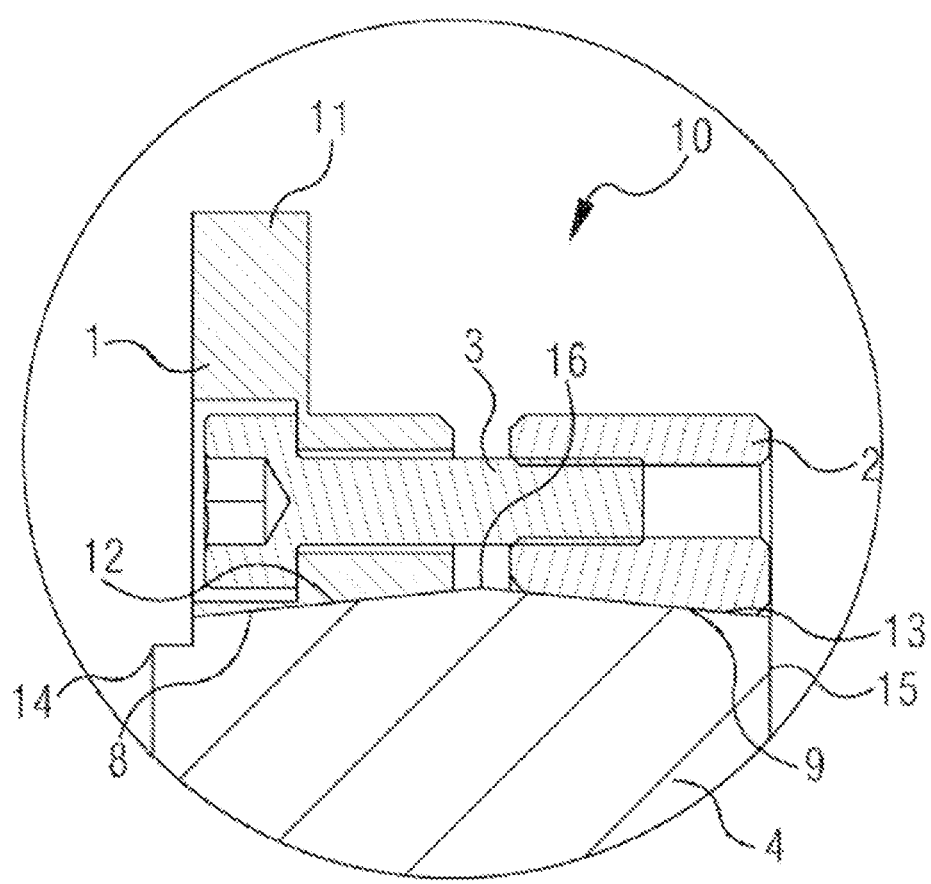
FIG. 5 is a partial cross-sectional view of a toothed safe braking apparatus for use in a robotic joint according to the present invention, taken at circle A in FIG. 3.

As shown in FIG. 5, the brake lock ring gear 1 and the pretension ring 2 are arranged in parallel via the first center fitting hole 12 and the second center fitting hole 13 by means of a lock screw 3 to be friction engaged on the outer circumferential surface 16 of the brake hub 4. The outer circumferential surface 16 of the brake hub 4 has a first conical surface 8 inclined upward from the first end surface 14 and a second conical surface 9 inclined upward from the second end surface 15. The first conical surface 8 and the second conical surface 9 on the outer circumferential surface 16 of the brake hub 4 are mirror images of each other with respect to a vertical section of the brake hub.

The first center fitting hole 12 of the brake lock ring gear 1 is configured as a conical hole, so as to fit with the first conical surface 8 on the outer circumferential surface 16 of the brake hub 4. The second center fitting hole 13 of the pretension ring 2 is configured as a conical hole, so as to fit with the second conical surface 9 on the outer circumferential surface 16 of the brake hub 4.

The brake lock ring gear 1 and the pretension ring 2 are arranged in parallel via a lock screw 3 to be friction engaged on the outer circumferential surface 16 of the brake hub 4, and a gap exists between the brake lock ring gear 1 and the pretension ring 2. Furthermore, the gap between the brake lock ring gear 1 and the pretension ring 2 can be adjusted via the lock screw 3, so as to control the pretension force exerted on the brake hub 4 by the brake lock ring gear 1 and the pretension ring 2.

The brake lock ring gear 1, the pretension ring 2, and the brake hub 4 can be made of the same material, such as steel. In different embodiments, the brake lock ring gear 1 and the pretension ring 2 can be made of high-strength spring steel, while the brake hub 4 is made of a more wear-resistant steel material.

In order to increase the wear resistance of the outer circumferential surface 16 of the brake hub 4, the first conical surface 8 and the second conical surface 9 of the brake hub 4 are coated with a ceramic material.

The operation process of the toothed safe braking apparatus for use in a robotic joint according to the present invention will be described in detail below:

Working Example 1: when the robot is powered, the working bit 17 of the electromagnetic telescoping apparatus 6 is retracted to be disengaged from the teeth of the brake lock ring gear 1. In this case, the toothed safe braking apparatus for use in a robotic joint is located at the unlocked position shown in FIG. 4, and the shaft C of the robotic joint can rotate normally.

Working Example 2: when the robot is powered off and an external load on the shaft is not large, the electromagnetic telescoping apparatus 6 is located at the locked position shown in FIG. 3, and the working bit 17 of the electromagnetic telescoping apparatus 6 protrudes and contacts the teeth on the brake lock ring gear 1, thereby stopping the rotation of the shaft C.

Working Example 3: when the robot is powered off and an external load on the shaft C is large, the electromagnetic telescoping apparatus 6 is located at the locked position shown in FIG. 3, the working bit 17 of the electromagnetic telescoping apparatus 6 protrudes and contacts the teeth on the brake lock ring gear 1, and the first fitting hole of the brake lock ring gear 1 slides relative to the first conical surface 8 of the outer circumferential surface 16 of the brake hub 4. Meanwhile, the second fitting hole of the pretension ring 2 slides relative to the second conical surface 9 of the outer circumferential surface 16 of the brake hub 4. The shaft C can slide with damping, thereby protecting a transmission gear of the robot.

In addition, the present invention further relates to a robot including the toothed safe braking apparatus for use in a robotic joint. The robot includes a working arm, a robotic joint connecting the working arm and provided with a shaft C, and a main support 5.

Although the toothed safe braking apparatus for use in a robotic joint of the present invention achieves friction engagement through the cooperation of the brake lock ring gear 1 and the pretension ring 2 with the conical surfaces of the brake hub 4 so as to provide a braking effect, those of ordinary skill in the art will appreciate that other embodiments may be employed in which various shapes of the brake lock ring gear 1 and the pretension ring 2 fit with the brake hub 4 to achieve friction engagement, thereby providing a braking effect.

The toothed safe braking apparatus for use in a robotic joint of the present invention utilizes the friction of the conical surfaces to brake. The toothed safe braking apparatus for use in a robotic joint is small in size, light in weight, low in heat generation, and reliable in operation, and can protect a shaft transmission mechanism. Because the robot includes the toothed safe braking apparatus for use in a robotic joint, the robot can make an emergency stop or brake to ensure safety.

It should be understood that although the description is described according to each embodiment, it does not mean that each embodiment only includes one independent technical solution. The description described in this way is merely for the purpose of clarity. Those skilled in the art should take the description as a whole into consideration, such that the technical solutions of various embodiments may also be combined appropriately to form other embodiments that can be understood by those skilled in the art.

The above are merely schematic specific embodiments of the present invention, and are not intended to limit the scope of the present invention. Any equivalent variations, modifications and combinations made by those skilled in the art without departing the concept and principle of the present invention fall within the scope of protection of the present invention.

The invention claimed is:

1. A toothed safe braking apparatus for use in a robotic joint, wherein a robot comprises a main support (5), and the robotic joint comprises a shaft (C), wherein the toothed safe braking apparatus for use in a robotic joint further comprises:
   an electromagnetic telescoping apparatus (6), mounted on the main support (5), and provided with a working bit (17) capable of moving between a locked position and an unlocked position along the direction of an axis of the shaft (C) of the robotic joint; and
   a friction engagement component (10), mounted to the shaft (C) of the robotic joint, the friction engagement component (10) comprising:
   a disc-shaped brake lock ring gear (1), provided with teeth (11) arranged on the outer circumference thereof and a first center fitting hole (12);
   a disc-shaped pretension ring (2), provided with a second center fitting hole (13); and
   a disc-shaped brake hub (4), provided with a first end surface (14), a second end surface (15), and an outer circumferential surface (16);
   wherein the brake lock ring gear (1) and the pretension ring (2) are arranged in parallel via the first center fitting hole (12) and the second center fitting hole (13) to be friction engaged on the outer circumferential surface (16) of the brake hub (4); and
   wherein in the locked position, the working bit (17) of the electromagnetic telescoping apparatus (6) can be engaged with the teeth (11) on the brake lock ring gear (1) of the friction engagement component (10), and in the unlocked position, the working bit (17) of the electromagnetic telescoping apparatus (6) can be disengaged from the teeth on the brake lock ring gear (1) of the friction engagement component (10); and wherein the outer circumferential surface (16) of the brake hub (4) has a first conical surface (8) inclined upward from the first end surface (14) and a second conical surface (9) inclined upward from the second end surface (15).

2. The toothed safe braking apparatus for use in a robotic joint according to claim 1, wherein the first conical surface (8) and the second conical surface (9) on the outer circumferential surface (16) of the brake hub (4) are mirror images of each other with respect to a vertical section of the brake hub (4).

3. The toothed safe braking apparatus for use in a robotic joint according to claim 1, wherein the first center fitting hole (12) of the brake lock ring gear (1) is configured as a conical hole, so as to fit with the first conical surface (8) on the outer circumferential surface (16) of the brake hub (4).

4. The toothed safe braking apparatus for use in a robotic joint according to claim 1, wherein the second center fitting hole (13) of the pretension ring (2) is configured as a conical hole, so as to fit with the second conical surface (9) on the outer circumferential surface (16) of the brake hub (4).

5. A toothed safe braking apparatus for use in a robotic joint, wherein a robot comprises a main support (5), and the robotic joint comprises a shaft (C), wherein the toothed safe braking apparatus for use in a robotic joint further comprises:
   an electromagnetic telescoping apparatus (6), mounted on the main support (5), and provided with a working bit (17) capable of moving between a locked position and an unlocked position along the direction of an axis of the shaft (C) of the robotic joint; and
   a friction engagement component (10), mounted to the shaft (C) of the robotic joint, the friction engagement component (10) comprising:
   a disc-shaped brake lock ring gear (1), provided with teeth (11) arranged on the outer circumference thereof and a first center fitting hole (12);
   a disc-shaped pretension ring (2), provided with a second center fitting hole (13); and
   a disc-shaped brake hub (4), provided with a first end surface (14), a second end surface (15), and an outer circumferential surface (16);
   wherein the brake lock ring gear (1) and the pretension ring (2) are arranged in parallel via the first center fitting hole (12) and the second center fitting hole (13) to be friction engaged on the outer circumferential surface (16) of the brake hub (4); and
   wherein in the locked position, the working bit (17) of the electromagnetic telescoping apparatus (6) can be engaged with the teeth (11) on the brake lock ring gear (1) of the friction engagement component (10), and in the unlocked position, the working bit (17) of the electromagnetic telescoping apparatus (6) can be disengaged from the teeth on the brake lock ring gear (1) of the friction engagement component (10); and
   wherein the brake lock ring gear (1) and the pretension ring (2) are arranged in parallel via a lock screw (3) to be friction engaged on the outer circumferential surface (16) of the brake hub (4), and a gap exists between the brake lock ring gear (1) and the pretension ring (2).

6. The toothed safe braking apparatus for use in a robotic joint according to claim 5, wherein the gap between the brake lock ring gear (1) and the pretension ring (2) can be adjusted via the lock screw (3).

7. The toothed safe braking apparatus for use in a robotic joint according to claim 1, wherein the brake lock ring gear (1), the pretension ring (2), and the brake hub (4) are made of the same material.

8. The toothed safe braking apparatus for use in a robotic joint according to claim 1, wherein the brake lock ring gear (1), the pretension ring (2), and the brake hub (4) are made of different materials.

9. The toothed safe braking apparatus for use in a robotic joint according to claim 1, wherein the first conical surface (8) and the second conical surface (9) of the outer circumferential surface (16) of the brake hub (4) are coated with a ceramic material.

10. A robotic joint, comprising the toothed safe braking apparatus according to claim 1.

11. A robot, comprising:
   a working arm;
   a main support (5); and
   a robotic joint having a shaft (C), the robotic joint being used for connecting the working arm and comprising a toothed safe braking apparatus, the toothed safe braking apparatus comprising:
   an electromagnetic telescoping apparatus (6), mounted on the main support (5), and provided with a working bit (17) capable of moving between a locked position and an unlocked position along the direction of an axis of the shaft (C) of the robotic joint; and
   a friction engagement component (10), mounted to the shaft (C) of the robotic joint, the friction engagement component (10) comprising:
   a disc-shaped brake lock ring gear (1), provided with teeth (11) arranged on the outer circumference thereof and a first center fitting hole (12);
   a disc-shaped pretension ring (2), provided with a second center fitting hole (13); and
   a disc-shaped brake hub (4), provided with a first end surface (14), a second end surface (15), and an outer circumferential surface (16);
   wherein the brake lock ring gear (1) and the pretension ring (2) are arranged in parallel via the first center fitting hole (12) and the second center fitting hole (13) to be friction engaged on the outer circumferential surface (16) of the brake hub (4); and
   wherein in the locked position, the working bit (17) of the electromagnetic telescoping apparatus (6) can be engaged with the teeth (11) on the brake lock ring gear (1) of the friction engagement component (10), and in the unlocked position, the working bit (17) of the electromagnetic telescoping apparatus (6) can be disengaged from the teeth on the brake lock ring gear (1) of the friction engagement component (10); and
   wherein the outer circumferential surface (16) of the brake hub (4) has a first conical surface (8) inclined upward from the first end surface (14) and a second conical surface (9) inclined upward from the second end surface (15).

12. The robot according to claim 11, wherein the first conical surface (8) and the second conical surface (9) on the outer circumferential surface (16) of the brake hub (4) are mirror images of each other with respect to a vertical section of the brake hub (4).

13. The robot according to claim 11, wherein the first center fitting hole (12) of the brake lock ring gear (1) is configured as a conical hole, so as to fit with the first conical surface (8) on the outer circumferential surface (16) of the brake hub (4).

14. The robot according to claim 11, wherein the second center fitting hole (13) of the pretension ring (2) is configured as a conical hole, so as to fit with the second conical surface (9) on the outer circumferential surface (16) of the brake hub (4).

15. The robot according to claim 11, wherein the brake lock ring gear (1), the pretension ring (2), and the brake hub (4) are made of the same material.

16. The robot according to claim 11, wherein the brake lock ring gear (1), the pretension ring (2), and the brake hub (4) are made of different materials.

17. The robot according to claim 11, wherein the first conical surface (8) and the second conical surface (9) of the outer circumferential surface (16) of the brake hub (4) are coated with a ceramic material.

18. A robotic joint, comprising the toothed safe braking apparatus according to claim 5.

19. A robot, comprising:
- a working arm;
- a main support (5); and
- a robotic joint having a shaft (C), the robotic joint being used for connecting the working arm and comprising a toothed safe braking apparatus, the toothed safe braking apparatus comprising:
- an electromagnetic telescoping apparatus (6), mounted on the main support (5), and provided with a working bit (17) capable of moving between a locked position and an unlocked position along the direction of an axis of the shaft (C) of the robotic joint; and
- a friction engagement component (10), mounted to the shaft (C) of the robotic joint, the friction engagement component (10) comprising:
    - a disc-shaped brake lock ring gear (1), provided with teeth (11) arranged on the outer circumference thereof and a first center fitting hole (12);
    - a disc-shaped pretension ring (2), provided with a second center fitting hole (13); and
    - a disc-shaped brake hub (4), provided with a first end surface (14), a second end surface (15), and an outer circumferential surface (16);
- wherein the brake lock ring gear (1) and the pretension ring (2) are arranged in parallel via the first center fitting hole (12) and the second center fitting hole (13) to be friction engaged on the outer circumferential surface (16) of the brake hub (4); and
- wherein in the locked position, the working bit (17) of the electromagnetic telescoping apparatus (6) can be engaged with the teeth (11) on the brake lock ring gear (1) of the friction engagement component (10), and in the unlocked position, the working bit (17) of the electromagnetic telescoping apparatus (6) can be disengaged from the teeth on the brake lock ring gear (1) of the friction engagement component (10); and
- wherein the brake lock ring gear (1) and the pretension ring (2) are arranged in parallel via a lock screw (3) to be friction engaged on the outer circumferential surface (16) of the brake hub (4), and a gap exists between the brake lock ring gear (1) and the pretension ring (2).

20. The robot according to claim 19, wherein the gap between the brake lock ring gear (1) and the pretension ring (2) can be adjusted via the lock screw (3).

\* \* \* \* \*